W. P. MENDENHALL.
TAIL LIGHT AND LICENSE PLATE HOLDER.
APPLICATION FILED JAN. 24, 1920. RENEWED SEPT. 22, 1921.
1,419,745. Patented June 13, 1922.
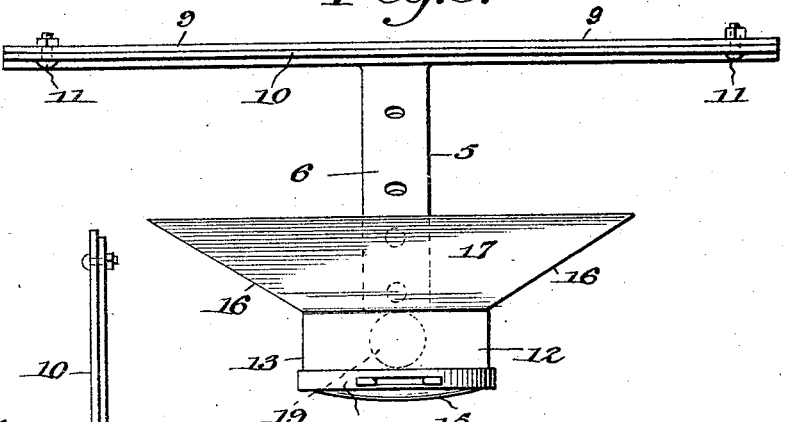
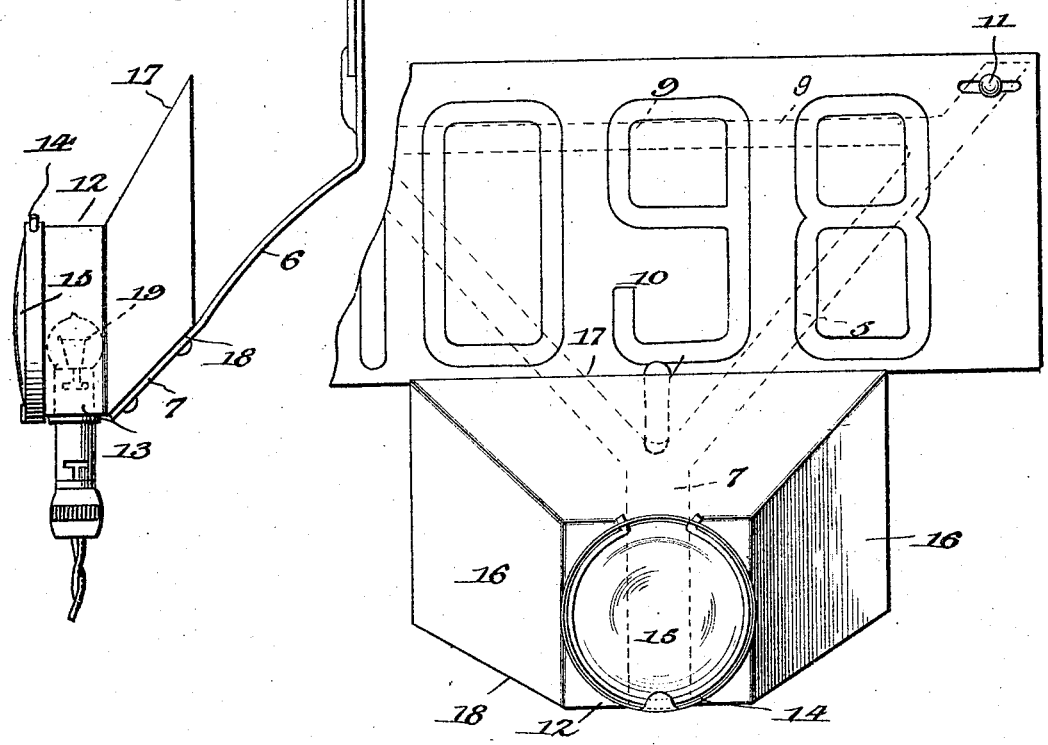
William P. Mendenhall.
INVENTOR

UNITED STATES PATENT OFFICE.

WILLIAM P. MENDENHALL, OF EAST ORANGE, NEW JERSEY.

TAIL-LIGHT AND LICENSE-PLATE HOLDER.

1,419,745. Specification of Letters Patent. Patented June 13, 1922.

Application filed January 24, 1920, Serial No. 353,891. Renewed September 22, 1921. Serial No. 502,493.

*To all whom it may concern:*

Be it known that I, WILLIAM P. MENDENHALL, a citizen of the United States, residing at East Orange, in the county of Essex and State of New Jersey, have invented new and useful Improvements in Tail-Light and License-Plate Holders, of which the following is a specification.

This invention relates to automobile license plate holders and illuminating means therefor and has for its primary object the provision of a plate holder and a lamp carried by the holder and designed to concentrate the light rays upon the license bearing surface of the plate and thereby render the latter clearly and uniformly visible throughout the length and breadth thereof and unable the owner of a car to properly comply with statutory regulations which make it compulsory that the license indicia be displayed in a manner to enable a correct reading thereof by persons who may be located at some distance from the car.

A still further object of the invention resides in the provision of a plate holder and illuminating means which will accommodate itself to ordinary or standard forms of license plates.

In the drawings:—

Figure 1, is a side view of the plate holder and illuminating means.

Figure 2 is a rear view thereof.

Figure 3 is a plan view of the same.

In carrying the invention into practice use is preferably made of a bracket 5 having a branch 6 adapted to be secured in any suitable well known manner to the mud guard or other desirable part of a car. Said bracket is provided with a rearwardly extending lamp supporting branch 7 and a forward vertical branch 8, the latter including transverse bars 9—9 to which a license plate 10 is secured by means of clamping bolts 11.

The intermediate attaching portion of the bracket between the branches 7 and 8 is arranged at an angle so that the base of the vertical branch 8 is disposed above the horizontal plane of the lamp supporting branch 7, the purpose of this construction being to permit of a proper illumination of the license plate in a manner to be presently explained.

A lamp casing 12 is mounted upon the rear extension 7 and the same includes a body portion 13 having a hinged apertured door 14 whose aperture is covered by a lens 15 of red glass so as to furnish the required warning or danger signal adapted to be displayed from the rear of the car. At the front end the body portion is connected with flared light reflecting and concentrating surfaces 16—16, 17 and 18. The said surfaces 16—16, 17 and 18 are relatively positioned with such regard to the size of the license plate whereby to cause the entire surface of the latter to be fully illuminated as will be understood. The rear end of the lamp casing is entirely open, the opening being bounded by the surfaces 16—16, 17 and 18 so as to permit of a non-interrupted projection of the light rays onto the indicia bearing surface of the plate. The angularity of the surfaces 16—16, 17 and 18 is such that the light rays will be cast entirely and uniformly over the number bearing surface of the license plate. The angle of each wall is preferably made so that the width and breadth of the reflected light ray will slightly exceed the length and breadth of said license plate.

The inclination of the intermediate portion of the bracket 5 is such that the light projecting mouth of the lamp casing is positioned at the proper point below the center of the license plate so as to prevent the lamp casing obstructing the line of vision. Any suitable illuminating lamp may be provided for the purpose of exhibiting the license plate and for visualizing the lens 15 of the structure. I prefer to use an ordinary incandescent lamp 19 which is adapted to be arranged in a suitable battery circuit, (not shown).

While the device as set forth shows the lamp below the number plate it is obvious that by merely inverting the device the lamp will be located above the number plate and will produce the same advantageous effects. The term "beyond" as employed in the claims is to be understood as meaning above or below.

What is claimed as new is:—

1. In means for supporting a license plate in a perpendicular position and illuminating the same, a bracket comprising arms for supporting a standard license plate in a vertical position and for supporting a lamp and a lamp housing below said plate and a considerable distance in rear of said plate, and a lamp housing supported by said bracket and comprising a lamp chamber and a frusto-conical mouth for directing the illumination against said plate, the open end of said mouth being substantially vertical, and terminating in substantially the horizontal plane of the lower edge of the license numerals, and the sides of said mouth being arranged at an angle to direct the light against and beyond the edges of the license plate, and the top of said mouth being arranged at an angle to direct the light against the plate only.

2. The combination with a license plate bracket comprising plate supporting arms and a lamp housing supporting arm; of a lamp housing carried by the last mentioned arm and comprising a lamp chamber and a mouth the full width of the housing at the rear, said arm being arranged to support the lamp a considerable distance in the rear of the vertical plane of the license plate and below the license plate, whereby the rays from the lamp are directed through the wide mouth to strike the entire license plate at a comparatively large angle and serve to intensely illuminate the entire plate.

In testimony whereof I have affixed my signature.

WILLIAM P. MENDENHALL.